Aug. 26, 1952 — L. S. WILLIAMS — 2,608,448
KNIFE EDGE PIVOT CONSTRUCTION
Filed March 29, 1946 — 2 SHEETS—SHEET 1
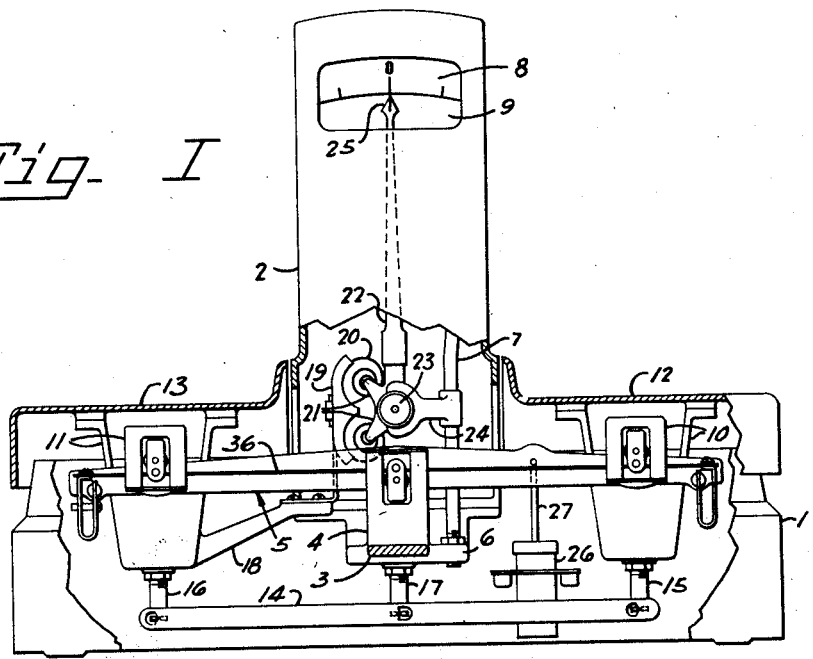
*Fig. I*
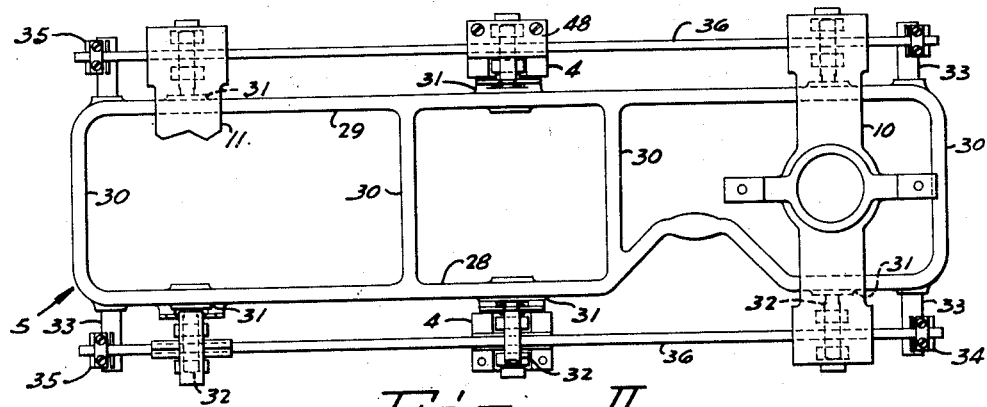
*Fig. II*
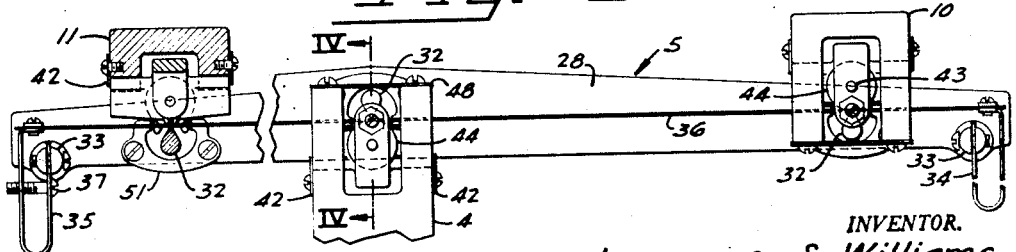
*Fig. III*
INVENTOR.
Lawrence S. Williams
BY
Marshall and Marshall
ATTORNEYS

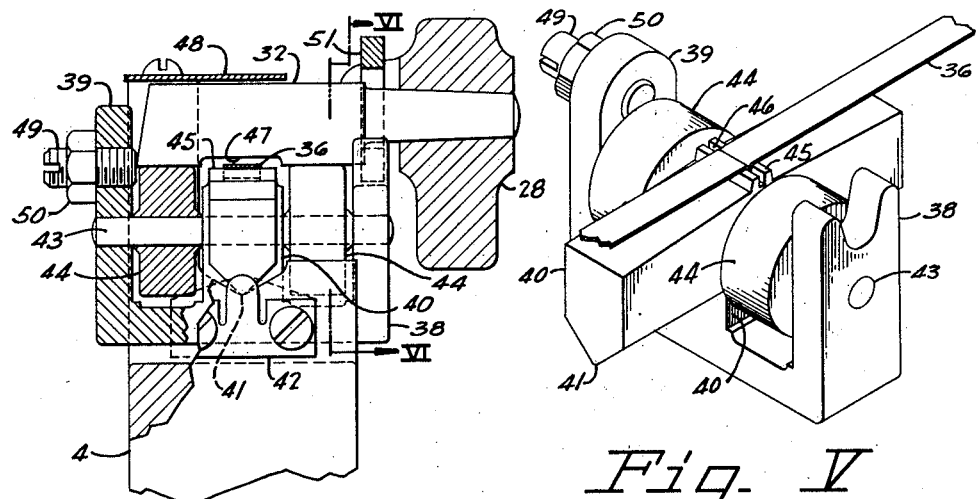
Fig. IV
Fig. V
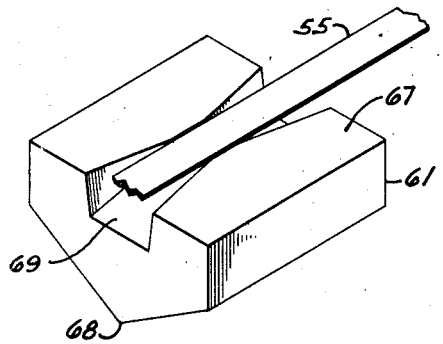
Fig. VIII
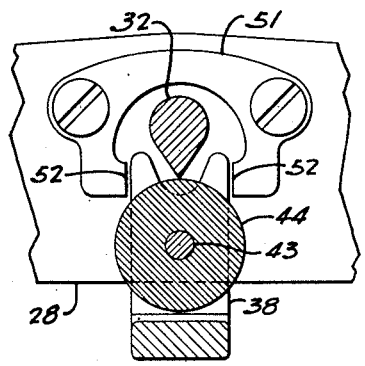
Fig. VI
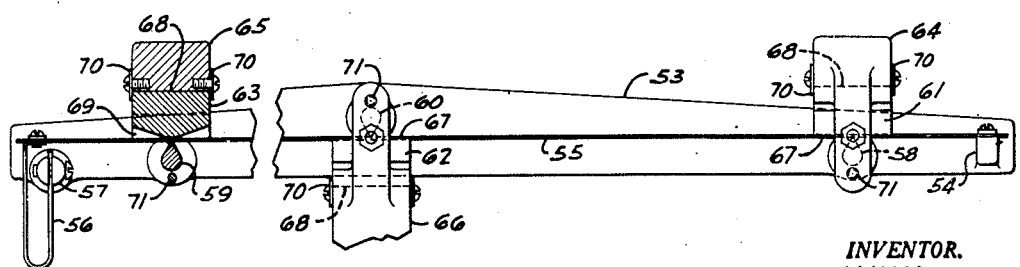
Fig. VII
INVENTOR.
Lawrence S. Williams
BY
Marshall and Marshall
ATTORNEYS Patented Aug. 26, 1952

2,608,448

UNITED STATES PATENT OFFICE 2,608,448

KNIFE EDGE PIVOT CONSTRUCTION

Lawrence S. Williams, Toledo, Ohio, assignor to Toledo Scale Company, Toledo, Ohio, a corporation of New Jersey Application March 29, 1946, Serial No. 658,038

6 Claims. (Cl. 308—2)

This invention relates to pivots and bearings for use in weighing scales and in particular to means for reducing friction and change errors in weighing scales.

A pivotal connection between parts of a weighing mechanism is usually made by means of a knife edge pivot resting on either a flat, hardened surface or in the valley between two inclined surfaces. The first type of construction—a knife edge resting on a flat surface—is commonly used in the construction of analytical balances, but has found little use elsewhere. It requires that some auxiliary mechanism usually in the form of a relieving gear, be provided to position the knife edge on the flat bearing immediately prior to each weighing. This dependence upon auxiliary mechanism for maintaining the relative position of the knife edge and flat bearing is the greatest drawback to the use of flat bearings in commercial weighing apparatus.

The other construction—the knife edge resting in the valley between two inclined plane surfaces—is preferred for use in weighing scales for commercial purposes. The bearing of this construction, commonly known as a V-bearing, is formed with a radius in the valley between the flat inclined sides so that an approximation to a flat bearing is provided for the knife edge. This construction eliminates the necessity of using a relieving gear because the knife edge will seek the lowest point in the valley of the V-bearing. A scale employing pivots resting in V-bearings shows changes in weight indication according to whether the knife edge is resting precisely at the bottom of the groove or valley of the V-bearing or whether it is displaced upwardly along one side or the other. This change error results because the knife edge is not infinitely sharp but is a cylindrical surface of small radius. When the small radius cylinder rests upon one of the sloping sides of the V-bearing the point of contact with the bearing is not on the exact bottom of the cylinder but is displaced to one side. This displacement results in a small change in effective pivot distance of the lever and causes resulting errors in its force transmission ratio.

Another fault of a knife edge and V-bearing is that the knife edge and bearing each attempts to accommodate itself to the shape of the other so that a condition similar to an axle turning in a journal is produced. This condition introduces friction into the scale.

The object of this invention is to provide a pivot and bearing assembly which retains the accuracy of a knife edge cooperating with a flat bearing without requiring a relieving gear and without being subjected to the errors usually associated with V-bearings.

Another object of the invention is to provide a flexible substantially non-stretchable strip of material to retain a knife edge and flat bearing in operative relation to each other.

Another object of the invention is to provide a pivot and bearing assembly in which independent means are provided for supporting the lever and for holding it in position.

A still further object is to provide a flexure strip for maintaining a pivot on a bearing having surfaces movable with respect to the flexure strip.

These and other objects and advantages are apparent from the following description of preferred embodiments in which reference is made to the accompanying drawings.

The invention consists in locating a bearing with respect to a knife edge by means of a flexure strip connected between the knife edge or a member containing the knife edge and the bearing or a member containing the bearing. In the preferred form of the invention a thin, steel ribbon is held under tension between spaced apart points of a weighing lever and in line with the pivot line of the lever. The ribbon passes closely adjacent to the knife edge of each of the pivots. At a point immediately adjacent the knife edge of the pivot the ribbon is secured to a bearing block which rests either in a fulcrum stand or in a spider supporting a load receiver. In a simplified embodiment of the invention the bearing block has flat surfaces against which the knife edge rests. In the preferred embodiment of the invention the bearing block journals one or more rollers arranged so that the knife edge bears against the periphery or peripheries of the rollers.

Both of the illustrated embodiments of the invention are characterized by having the horizontal position of the knife edge on the bearing positively controlled by means other than the contact between the knife edge and the bearing.

The preferred embodiment and a simplified embodiment of the invention are illustrated in the accompanying drawings.

In the drawings:

Figure I is a front elevation with parts broken away of a weighing scale embodying the invention.

Figure II is a plan of the lever showing the arrangement of the pivot and bearing assemblies.

Figure III is an enlarged side elevation with parts shown in section of a lever incorporating the improved pivot and bearing assemblies.

Figure IV is an enlarged section taken substantially along the line IV—IV of Figure III.

Figure V is an enlarged perspective view of the improved bearing.

Figure VI is a fragmentary vertical section taken along the line VI—VI of Figure IV.

Figure VII is a side elevation, parts shown in section of a lever incorporating a simplified embodiment of the invention.

Figure VIII is a perspective view of the simplified bearing.

These specific figures and the accompanying description are intended merely to illustrate the invention but not to impose limitations upon the claims.

The improved pivot and bearing constructed according to the invention may be used wherever an accurate low friction pivotal connection is required. These applications may include pivots and bearings for supporting the platforms of truck scales, railroad track scales, or at the other extreme, the levers and platforms of small "over and under" scales or laboratory balances. A small scale of the "over and under" variety having pivots and bearings constructed according to the invention is illustrated in Figure I. This scale has a substantially rectangular hollow base 1 from whose center portion an indicator tower 2 is erected. A transverse bridge 3 extending across the center of the rectangular base 1 supports fulcrum stands 4 on which a lever 5 is pivotally mounted. From a laterally extending portion 6 of the bridge 3 a standard 7 extends upwardly into the indicator tower 2 and at its upper end supports a chart 8 which may be viewed through a window 9. The lever 5 pivotally supports spiders 10 and 11 on which load and weight receiving platters 12 and 13 are mounted. The platters 12 and 13 are maintained level by check links 14 which pivotally connect depending studs 15 and 16 of the spiders 10 and 11 to a depending post 17 secured to the underside of the transverse bridge 3.

An arm 18 formed as part of the spider 11 extends toward the center of the base housing 1 and at its extremity carries an indicator counterforce spring bracket 19. A pair of spiral counterforce springs 20 whose outer ends are clamped in the bracket 19 have their inner ends attached to arms 21 of an indicator assembly 22. The indicator assembly 22 is pivotally mounted in a bearing 23 supported in a horizontally extending arm 24 which is mounted on the upright standard 7. The indicator assembly 22 has an index portion 25 which cooperates with the chart 8 to indicate the direction and amount of an unbalance between a load applied to the platter 12 and counterweights applied to the platter 13.

Continued oscillation of the lever 5 and the parts connected thereto is prevented by a hydraulic dashpot 26 whose plunger stem 27 is pivotally connected to the lever 5.

The lever 5 (Figure II) is formed with side members 28 and 29 which are connected by cross members 30. The side members 28 and 29 have spaced bosses 31 which are machined to receive tenon pivots 32.

Each end of the lever 5 is provided with laterally extending studs 33 to which U-shaped springs 34 and 35 (Figure III) are attached. The upper ends of the springs 34 and 35 are in line with the pivot line of the lever 5 and the springs serve to stretch bearing locating ribbons 36 and position the ribbons with respect to the lever. The springs 34 and 35 have about equal rate but the spring 35 is designed to provide approximately twice the pull of the spring 34 when they are held in the positions shown in Figure III. A screw 37 passing loosely through one leg of the U-shaped spring 35 and threaded through the other leg, is adjusted to absorb the difference in pull between the springs. This in effect provides a preloaded resilient connection between the ribbons 36 and the lever 5 (so that severe endwise forces or shocks applied to the lever will not break the ribbons) in which the spring tensions are sufficient to normally hold the lever with its knife edge pivots in correct relation with respect to their cooperating bearings.

The improved pivot and bearing construction is shown in Figure IV. The top of each fulcrum stand 4 is U-shaped when viewed from the side of the scale and is substantially J-shaped when viewed from the end of the scale. The bottom of the cut forming the U is considerably deeper than the transverse cut forming the J, while the bottom of the transverse cut forms a V-groove for rockably supporting the bearing assembly. The bearing assembly, shown in perspective in Figure V, has a frame which when viewed from the end of the scale is shaped like an E laid on its back. It has upstanding portions 38, 39 and 40 separated by deep rectangular grooves. The upper parts of the center portion 40 extend fore and aft, perpendicular to the plane of the E, and are beveled on their lower sides to provide blunt knife edges 41 which, when the bearing is assembled into the fulcrum stand 4, rest in the V-groove in the fulcrum stand. The bearing frame is held in place on the fulcrum stand by thrust plates 42 which contact the ends of the blunt knife edge 41. One of the thrust plates 42 is made resilient while the other is stiff so that the bearing frame will be positively positioned against movement parallel to the lever but will be permitted to rock on the blunt knife edge 41.

An axle 43 spanning the spaces between the upstanding portions of the bearing frame journals a pair of hardened rollers 44. An elevated portion 45 of the upper surface of the center portion 40 of the bearing frame has a transverse sawcut 46 into which a formed section of the bearing stabilizing ribbon 36 may be inserted and secured. The upper surfaces of the peripheries of the hardened rollers 44 and the neutral axis of the ribbon 36 are substantially in line. The center portion of the length of the knife edge has a notch 47 to clear the ribbon 36 when the knife edge is resting on the hardened rollers 44.

A plate 48 screwed to the top of the fulcrum stand 4 overlies the pivot 32 and prevents it from being displaced.

The end thrust of the pivot 32 is taken by a hardened screw 49 threaded through the upright portion 39 of the bearing frame and held in place by a lock nut 50. The end of the screw contacts a point on the beveled end of the pivot 32.

When this pivot and bearing is assembled the bearing assembly rocks about the blunt knife edge 41 until the load of the tenon pivot 32 is equally divided between the hardened rollers 44. The bearing assembly cannot shift endwise in the fulcrum stand 4 because of the thrust plates 42, nor can it shift sidewise because that would require that it slide up the inclined surfaces which support the blunt knife edge 41. The pivot cannot roll off the uppermost portion of the rollers because of the positioning ribbons 36 which hold the lever and pivot in place with respect to the bearing assembly. As the lever rocks on the pivot the stabilizing or positioning ribbons 36 are slightly bent but the restoring effect or spring effect of the ribbons is negligible in so far as its effect on the accuracy of the scale is concerned. As the lever rocks it pivots about an axis determined by the knife edges. This pivoting axis may or may not coincide exactly with the neutral axis of the ribbons 36. If it does not coincide exactly the knife edge executes a horizontal motion parallel to the length of the lever, the amplitude of which motion is dependent upon the angle through which the lever turns and the vertical distance between the neutral axis of the ribbon 36 and the convex surfaces of the rollers 44. The rollers 44 are free to turn so that this motion of the knife edge may be accommodated without introducing friction into the weighing scale. While plain hardened rollers are shown and have been found to be satisfactory in most applications of the improved bearing, some further improvement in the reduction of friction may be obtained by employing ball or roller bearings for journalling the rollers 44.

In normal operation the only structure resisting endwise motion of the lever 5 with respect to the fulcrum stand 4 or the load receiving spiders 10 and 11 are the ribbons 36. These ribbons are made quite light so as not to affect the sensitivity of the scale and are therefore liable to be damaged if excessive force is applied against the end of the lever or against the load receiving platters 12 or 13. The protection afforded by the U-shaped springs 34 and 35 takes care of small longitudinal displacements of the parts and this protection is augmented by relatively heavy inverted U-shaped members 51 rigidly secured to the lever and having bumper stops 52 juxtaposed to the side surfaces of the upright portion 38 of the bearing assembly at substantially the same elevation as the knife edge of the pivot 32. The clearance between the bumper stops 52 and the upright portion 38 is sufficient to prevent contact in normal weighing, but is close enough to stop endwise motion of the lever before the ribbons are damaged.

Similar pivot and bearing assemblies are used to support the spiders 10 and 11 from the weighing lever. These bearings are identical with the fulcrum bearings except that they are inverted so as to rest upon knife edges of the lever, whereas the fulcrum bearings support the lever knife edge.

It is occasionally desirable to compromise between accuracy and simplicity of construction. An accuracy intermediate between conventional pivots and bearings and the preferred improved bearing may be obtained in a simplified version of the invention in which the knife edge rests upon flat surfaces of the bearing and the rollers are eliminated. A lever 53 (Figure VII) similar to the lever 5 has a lug 54 projecting laterally from an end of the lever. (Since both sides of the lever are similarly equipped only the structure on one side is described.) The top of the lug 54 is machined flat and in line with the pivot line of the lever 53. A thin steel ribbon 55 is rigidly attached to the flat surface of the lug 54 and stretched along the length of the lever and at its other end is held by a U-shaped spring 56 mounted from a laterally projecting stud 57.

The lever 53 is provided with load pivots 58 and 59 and a fulcrum pivot 60. Bearing blocks 61, 62 and 63 are attached to the ribbon 55 and are supported in portions 64 and 65 of weight receiving spiders and in a fulcrum stand 66. The bearing blocks 61, 62 and 63 are identical and one of them is shown in perspective in Figure VIII. The bearing 61, formed with a generally flat hardened upper surface 67, is nearly square in plan and has sections of its bottom surface cut away leaving a downwardly directed ridge 68 on which the bearing may rock. A trough 69 cut through the generally flat upper surface 67 and parallel to the downwardly directed ridge 68 accommodates the steel ribbon 55. The trough 69 is relatively wide and deep at its ends and tapers to a shallow narrow section at the center of the upper surface of the block. For best results the depth of the trough at its restricted point is about half the thickness of the ribbon 55. The ribbon 55 is welded or otherwise secured in the restricted portion of the trough 69. The knife edge pivots 58, 59 or 60 of the lever have shallow notches similar to the notch 47 of the tenon pivots 32 so that the pivots will not transfer or rub on the ribbons. The bearing blocks 61, 62 and 63 are spaced along the ribbon 55 so that their transverse center lines are opposed to the knife edge pivots.

The bearing blocks are secured in their respective supporting members by end thrust plates 70 which contacting the ends of the ridge 68 of the bearings prevents lateral motion thereof. As in the previous example end thrust of the pivots is taken on hardened set screws, while the pivots and connected structures are held from vertical displacement by screws 71 which are positioned closely adjacent but not touching the backsides of the lever pivots.

This simplified version of the invention exhibits friction according to the vertical distance between the flat upper surface 67 of the bearing and the neutral axis of the ribbon 55. This friction results because the knife edge attempts to simultaneously rotate about an axis through the neutral plane of the ribbon and another axis lying in the knife edge of the pivot. If these two rotating axes are coincident, no friction develops. If they are not exactly coincident but are nearly so the ribbon may stretch enough to allow the lever to oscillate without sliding the knife edge on the bearing surface. However, if a larger distance between the axes exists the knife edge will slide on the bearing surface and the scale will show an appreciable friction. In ordinary methods of construction the ribbon may be located sufficiently in line with the flat surface 67 of the bearing so that the sliding friction is absent or negligible.

The use of auxiliary means to hold a knife edge on a flat or convex bearing allows the accuracy of a weighing scale to be materially increased without the complication or inconvenience of elaborate relieving mechanisms.

Various modifications of the structure shown in the drawings may be devised when adapting the improved pivot and bearing construction to specific uses. The described embodiments are merely illustrative to show the principles of the invention and are not intended to define the scope of the invention.

Having described the invention, I claim:

1. In a device of the class described, in combination, a member, a knife edge pivot extending from the member, a strip of bendable, substantially nonstretchable material attached to the member at spaced apart points and passing closely adjacent the knife edge of the pivot, a bearing block that is receivable in a member to be pivotally connetced to said member, said bearing block having a transverse ridge to which the strip of material is attached, and a roller journaled in the block with the uppermost portion of its periphery substantially tangent to a plane through the strip and the transverse ridge for opposing the knife edge.

2. In a device of the class described, in combination, a member, a knife edge pivot extending from the member, a strip of bendable, substantially nonstretchable material attached to the member at spaced apart points and passing closely adjacent the knife edge of the pivot, a bearing block that is receivable in a member to be pivotally connected to said member, said bearing block having a transverse ridge to which the strip of material is attached, and a pair of rollers that are journaled in the block one on either side of the strip with their peripheries substantially tangent to a plane through the strip and the transverse ridge for opposing the knife edge.

3. In a device of the class described, in combination, a first member, a knife edge pivot extending from the first member, a strip of bendable, substantially nonstretchable material attached to the member at spaced apart points and passing closely adjacent the knife edge of the pivot along a line generally perpendicular to the knife edge, a bearing block that is receivable in a second member to be pivotally connected to said first member, said bearing block being attached to the strip of material, and a roller for supporting the knife edge, the roller being journaled in the bearing block with its axis parallel to the knife edge of the pivot and its periphery tangent to the plane of the strip of material at the knife edge.

4. In a device of the class described, in combination, a first member having a pivot line, a knife edge pivot extending from the first member with its edge at the pivot line, a bearing that is receivable in a second member to be pivotally connected to said first member and that has a surface opposed to the knife edge, a strip of bendable, substantially nonstretchable material mounted on the first member to extend along its pivot line and attached to said bearing at a point substantially in the plane of the knife edge opposing surface, and resilient means interposed between one end of the strip and the first member for maintaining substantially constant tension in the strip.

5. In a device of the class described, in combination, a first member having a pivot line, a knife edge pivot extending from the first member with its edge at the pivot line, a bearing that is receivable in a second member to be pivotally connected to said first member and that has a surface opposed to the knife edge, a strip of bendable, substantially nonstretchable material extending along the pivot line of the first member and attached to said bearing at a point substantially in the plane of the knife edge opposing surface, and resilient means mounted on the first member for attaching the ends of the strip to the first member, at least one of said resilient strip holding means being preloaded.

6. In a device of the class described, in combination, a first member having a pivot line, a knife edge pivot extending from the first member with its edge at the pivot line, a bearing that is receivable in a second member to be pivotally connected to said first member and that has a surface opposed to the knife edge, a strip of bendable, substantially nonstretchable material extending along the pivot line of the first member and attached to said bearing at a point substantially in the plane of the knife edge opposing surface, resilient means mounted on the first member for connecting the ends of the strip to the first member and stops on the bearing and first member for limiting the displacement between the bearing and first member permitted by the resilient strip attaching means.

LAWRENCE S. WILLIAMS.

REFERENCES CITED

The following references are of record in the file of this patent:

UNITED STATES PATENTS

| Number | Name | Date |
|---|---|---|
| 1,469,231 | Marbury | Oct. 2, 1923 |
| 1,549,977 | Hem | Aug. 18, 1925 |
| 1,583,251 | Hem | May 4, 1926 |
| 2,368,626 | Williams | Feb. 6, 1945 |